United States Patent [19]
Bolyn et al.

[11] Patent Number: 5,920,898
[45] Date of Patent: Jul. 6, 1999

[54] MEMORY CONTROL UNIT PROVIDING OPTIMAL TIMING OF MEMORY CONTROL SEQUENCES BETWEEN DIFFERENT MEMORY SEGMENTS BY OPTIMALLY SELECTING AMONG A PLURALITY OF MEMORY REQUESTS

[75] Inventors: Philip C. Bolyn, Norristown; Mark D. Luba, North Wales, both of Pa.

[73] Assignee: Unisys Corporation, Blue Bell, Pa.

[21] Appl. No.: 08/698,001

[22] Filed: Aug. 16, 1996

[51] Int. Cl.[6] ........................................................ G06F 13/16
[52] U.S. Cl. .............................. 711/167; 711/106; 711/169
[58] Field of Search ....................................... 711/104, 105, 711/106, 147, 152, 163, 167, 168, 169

[56] References Cited

U.S. PATENT DOCUMENTS

| 4,384,326 | 5/1983 | Devchoudhury | 711/163 |
|---|---|---|---|
| 5,040,153 | 8/1991 | Fung et al. | 365/230.03 |
| 5,043,937 | 8/1991 | Glaise et al. | 711/147 |
| 5,129,073 | 7/1992 | Murakami et al. | 711/105 |
| 5,265,231 | 11/1993 | Nuwayser | 711/106 |
| 5,283,877 | 2/1994 | Gastinel et al. | 711/105 |
| 5,313,624 | 5/1994 | Harriman et al. | 395/182.04 |
| 5,507,005 | 4/1996 | Kojima et al. | 395/872 |
| 5,625,790 | 4/1997 | Cutter | 711/104 |
| 5,634,038 | 5/1997 | Saitoh | 711/163 |
| 5,761,731 | 6/1998 | Van Doren et al. | 711/155 |
| 5,761,732 | 6/1998 | Shaberman et al. | 711/157 |

FOREIGN PATENT DOCUMENTS 0 380 844 A2  8/1990  European Pat. Off. .

OTHER PUBLICATIONS

"Shared Memory Design with Input and Output Queues", IBM Technical Disclosure Bulletin, vol. 34, No. 2, pp. 400–403, Jul. 1991.

"Multiprocessing System Memory Access Queue and Scheduling Apparatus", IBM Technical Disclosure Bulletin, vol. 34, No. 12, pp. 299–300, May 1992.

Primary Examiner—Tod R. Swann
Assistant Examiner—Conley B. King, Jr.
Attorney, Agent, or Firm—John B. Sowell; Mark T. Starr; Steven B. Samuels

[57] ABSTRACT

A memory controller is described that comprises individual control segments for controlling memory that is divided into individual pairs of memory segments. The programmable memory controller provides improved average access times for memory devices by reducing the number of wait cycles between memory operations. A common data bus is shared between the memory segments. Each control segment provides individual sets of address and control lines to each memory segment so that control sequences can occur simultaneously between multiple control and memory segments. Accordingly, when a control sequence is in process within one segment, another control sequence can occur simultaneously in another segment. By overlapping control sequences in this fashion, the bandwidth of the data bus is increased by remaining idle less frequently. Each control segment provides a plurality of allow mode signals to the other control segment. The allow mode signals are used by a request selector to select a memory request from a plurality of pending memory requests, such that the selected request can begin as soon as one of the control segments is ready to accept such a request.

19 Claims, 6 Drawing Sheets

MEMORY CONTROL UNIT PROVIDING OPTIMAL TIMING OF MEMORY CONTROL SEQUENCES BETWEEN DIFFERENT MEMORY SEGMENTS BY OPTIMALLY SELECTING AMONG A PLURALITY OF MEMORY REQUESTS

CROSS-REFERENCE TO OTHER APPLICATIONS

The following application, filed concurrently herewith, is of common assignee and inventorship and contains some common disclosure:

"Memory Control Unit Using Preloaded Values To Generate Optimal Timing Of Memory Control Sequences Between Different Memory Segments", U.S. application Ser. No. 08/698,979, filed Aug. 16, 1996, incorporated herein by reference in its entirety.

BACKGROUND OF THE INVENTION

1. Field of the Invention

The present invention relates generally to computer systems, and more particularly to memory controlling devices. Specifically, the present invention is directed toward a programmable memory controller that provides faster memory access rates by using pairs of memory segments and optimally controlling the timing sequences between the pairs of segments by optimally ordering a plurality of pending memory requests between a plurality of requestors.

2. Related Art

The two most common types of semiconductor random access memories (RAMs) used in modern computer systems are static random access memory (SRAM), and dynamic random access memory (DRAM). Typically DRAMs are most often used when large amounts of memory are required, such as for an implementation of a computer system's primary storage. SRAMs are used most often when smaller amounts of memory are required and/or faster access rates are desired. For example, SRAMs are often used in computer systems as fast cache memory.

DRAMs are most often implemented when large amounts of memory are needed due to their lower costs and space requirements compared to SRAMs. However, the use of DRAMs require more complicated support circuitry than SRAMs. SRAMs store bits of data in an array of flip-flops. Once a bit is written in a SRAM, it remains there until it is either changed by another write sequence or energy is removed from the memory circuit.

DRAMs, on the other hand, store bits of data as charged capacitors. Because DRAMs are typically implemented using only a single transistor per bit of storage, they can be fabricated much more densely than SRAMs which typically require from 4–6 transistors per bit. However, because DRAMs store bits of data as charges, they are unstable because the charges leak off in a very short amount of time, usually within a few milliseconds. Thus, if DRAMs are not continuously attended to by a procedure known as 'refresh' they are subject to memory loss.

Refresh is accomplished by accessing the data within each cell in a DRAM. DRAM chips are generally organized in a matrix having rows and columns. In order to effectively perform refresh operations without taking an inordinate amount of time by continuously reading and writing to each cell every couple of milliseconds, DRAMs are organized so that an entire row may be refreshed during a single operation. This feature dramatically decreases the amount of time spent on refresh cycles.

Additionally, the row/column organization of DRAMs facilitates the use of fewer address lines that need to be connected to each DRAM chip. Each memory location within a DRAM is addressed by specifying a particular row address and a particular column address. The intersection of a row and column address identifies a specific memory location. By time multiplexing the row address and the column addresses, the same address lines can be used for both components of the address, thereby reducing the number of required address lines.

For example a DRAM chip that has a capacity of 64 Mbits may be arranged as a matrix comprising 8192 columns and 8192 rows. Generally, in order to address 64 Mbits of data using linear addressing techniques, 26 address lines are required. However, by time multiplexing the row and column address (i.e. by presenting the row address, followed by the column address), only 13 address lines are required.

In order to handle the refresh, address multiplexing, and other stringent control and timing requirements of DRAMS (discussed below), complex support circuitry is required. This is to be contrasted with the relatively simple support circuitry required by SRAMs. However, such complex support circuitry can be shared among large arrays of DRAMs making the additional cost less significant for systems that employ large memory arrays. Indeed, for systems that employ large memory arrays, the savings realized in both semiconductor real estate and lower memory costs generally outweigh the additional expense associated with the complex support circuitry.

Thus, computer system design engineers who wish to use DRAMs in their system designs must supply the required DRAM support circuitry. Generally, DRAM manufacturers provide specifications for each type of DRAM they produce. Such specifications comprise information needed to support each operating mode of the DRAM. Frequently, the specifications include timing diagrams comprising a plurality of digital waveforms. Each timing diagram depicts the control signals and their associated timings that are required to support each mode of operation of the DRAM. Typically, DRAMs support at least three modes of operation: a read, a write, and a refresh. A typical read cycle sequence can involve more than 20 timing parameters, all of which must be held within the specified limits to insure proper read operations. Write and refresh cycle timings are similarly complex.

The timing requirements, refresh requirements and the address multiplexing techniques used for DRAMs all tend to increase the access time. Typically, access times for the fastest commercial off the shelf (COTS) DRAMs commonly available today are in the range of 50–70 nano seconds (ns). This is to be contrasted with access times for the fastest COTS SRAMs, which are in range of 5–15 ns. The control timing requirements of DRAMs are partially responsible for their relatively long access times.

Such control timings are often the cause of undesirable wait cycles during and between memory access operations. Typically, a fixed period of time must elapse before and after a DRAM memory access operation. For example, pursuant to a DRAM read operation, several sequential events must occur before data is output on the data bus. This time period is referred to herein as the set-up time. Likewise, after a DRAM memory read operation has taken place, a fixed period of time must elapse before the DRAM is ready to accept another memory access command. This time period is referred to herein as the row address strobe (RAS) precharge time. Thus, using conventional methods, system data busses are not utilized to their optimal capacity when using DRAM devices. It is common for such data busses to sit idle for significant periods of time during and between memory access sequences.

SUMMARY OF THE INVENTION

Accordingly, the present invention is directed toward a programmable memory controller that provides improved average access times for memory devices by reducing the number of wait cycles between memory operations. Memory is divided into a pair of memory segments. A common data bus is shared between the memory segments, but each segment is provided with individual sets of address and control lines. Thus, when a control sequence is in process within one segment, another control sequence can occur simultaneously within the second segment. By overlapping control sequences in this fashion the shared data bus can be used by the second segment as soon as it is released by the first segment. This increases the bandwidth of the common data bus by decreasing the amount of time the data bus remains idle.

Individual control logic is provided for each memory segment (hereinafter referred to as 'control segments'). Each complementary control segment provides individual sets of control and address lines to a corresponding memory segment. The coordination between control sequences occuring within the two control segments is accomplished by a series of allow mode signals that are transmitted between the control segments. Accordingly, each control segment provides allow mode signals to the other control segment. An allow mode signal indicates to the other control segment that a particular control sequence can begin therein.

Thus, each control segment provides one allow mode signal for each mode of operation that can be performed by the memory controller. For example, a typical DRAM memory controller performs three modes of operations, namely a read, a write and a refresh. Therefore, using this example, three allow mode signal generators, an allow read, an allow write and an allow refresh are provided within each control segment. Each control segment maintains a set of allow mode signal generators that are used by the other control segment to determine when a particular control sequence can begin therein.

In addition, to facilitate the optimization of the memory control sequences among each segment, memory addresses may be interleaved between each pair of memory segments. For example, all even address locations may be contained in one memory segment and all of the odd locations may be contained in the other memory segment. By interleaving the addressess locations in this fashion, it becomes more likely that a memory request for one memory segment will be pending while a memory operation is taking place in the other memory segment.

The present invention further increases the bandwidth of the shared data bus for computer systems that employ multiple memory requesters, such as multiprocessor computer systems and the like. Memory requests from a plurality of requestors are maintained in a corresponding plurality of memory request queues. Each memory request queue may be managed by re-ordering the requests therein according to a predefined priority or by simpler methods such as on a first-in first-out (FIFO) basis. In either case the next request to be processed from a memory request queue is referred to herein as the 'current request'. Accordingly, at any point in time each memory request queue contains a current request.

The allow mode signals, as described above, provides notification as to when a particular type of memory sequence can begin within a particular control segment. These signals are used by the present invention to determine when a particular memory sequence is 'allowed'. Thus, at any point in time, when it is determined that at least one current request is allowed, all of the current requests from each of the plurality of memory request queues are captured. Once a set of current requests are captured, all captured requests are analyzed in parallel during each clock pulse. The captured requests are simultaneously examined during each clock pulse to determine if any are currently allowed. When one captured request is allowed it is immediately processed. The remaining captured requests are further examined in parallel upon each clock pulse until all requests have been processed. When the control sequence for the final captured request has been started, the plurality of memory request queues are advanced and the preceding process is repeated for the next set of current requests.

BRIEF DESCRIPTION OF THE FIGURES

The present invention will be described with reference to the accompanying drawings, wherein:

FIG. 5 comprising

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

The present invention is directed toward a programmable memory controller that provides improved average access time for memory devices by reducing the number of wait cycles between memory operations. Each block of memory is divided into a two segments sharing a common data bus. Each segment has its own individual sets of address and control lines. The control sequences between segments are overlapped so that a shared data bus can be used by one segment immediately after it is released from use by the other segment.

Individual control segments are provided for each memory segment. The coordination between control sequences occuring within the two control segments is accomplished by a series of allow mode signals that are transmitted between the control segments. Accordingly, each control segment provides allow mode signals to the other control segment, which indicates when a particular control sequence can begin therein. An example of programmable waveform generators that provide allow mode signals as discussed above, is disclosed in the aforementioned cross referenced application.

The present invention optimizes the ordering of pending memory requests from a plurality of requesters, to best utilize the overlapping control sequence capability as discussed above. Memory requests from a plurality of requesters are maintained in a corresponding plurality of memory request queues. Current requests from each memory request queue are analyzed in parallel during each clock pulse. All current requests are captured when at least one current request is active. All captured requests are simultaneously examined upon each clock pulse and immediately processed as soon as allowed thereby decreasing the amount of time the shared data bus remains idle.

The examples provided herein describe a preferred embodiment of the present invention as it relates to the control of a DRAM device. However, an embodiment of the present invention may be implemented with any type of memory device that can be arranged in multiple segments, including without limitation, static random access memory (SRAM), video memory (VRAM), three-dimensional random access memory (3DDRAM), synchronous dynamic random access memory (SDRAM), Windows random access memory (WRAM), Cache DRAM, Mulitbank DRAM, and other memory devices not yet conceived.

Figure 1:
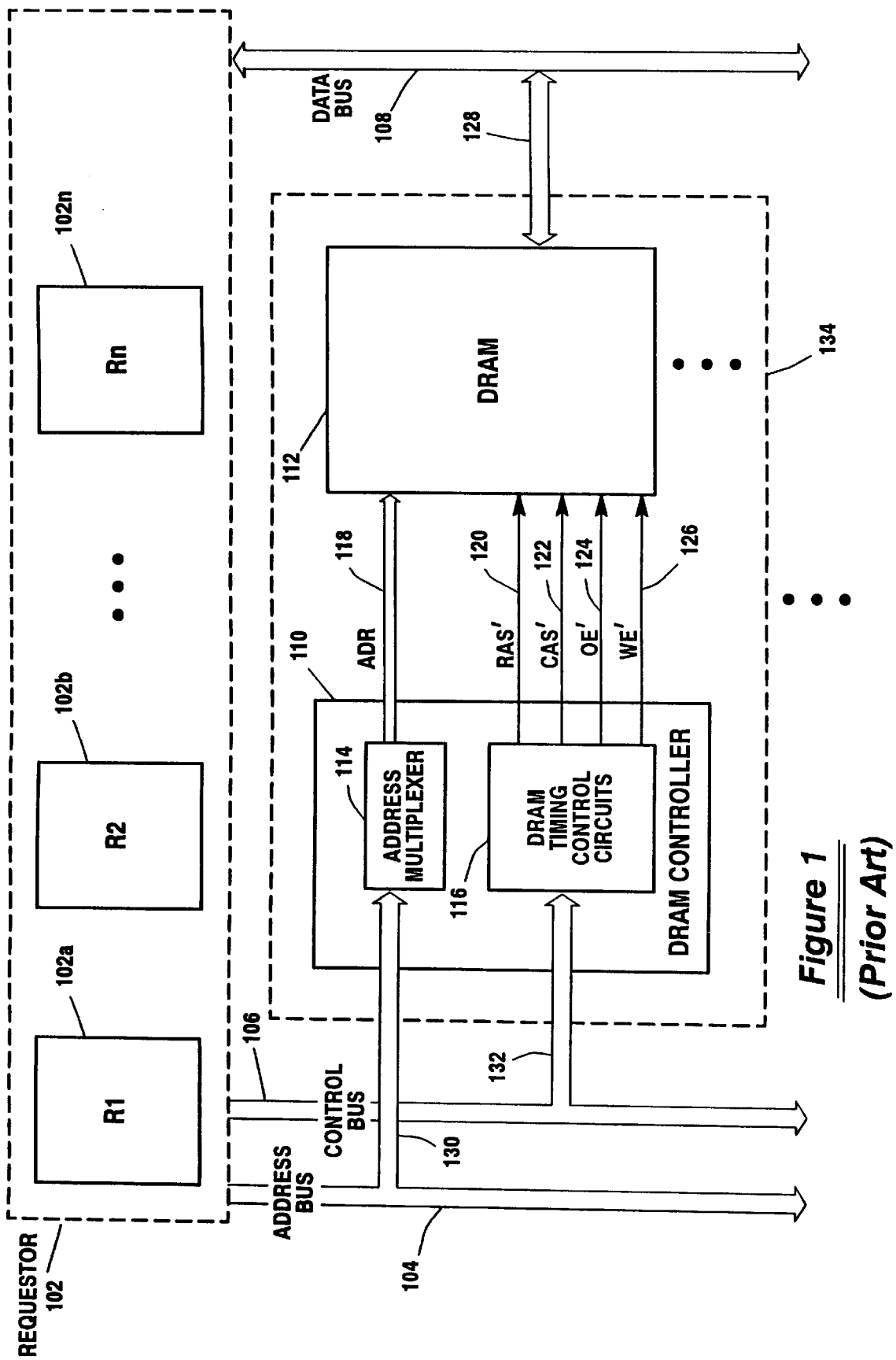
FIG. 1 is a block diagram depicting a typical operating environment for the present invention.

FIG. 1 is a block diagram depicting a typical operating environment for the present invention. FIG. 1 shows a plurality of requesters, 102a, 102b, . . . , and 102n (generally 102), a DRAM controller 110 and a DRAM 112. Each requestor 102 can be any device that can interface with the DRAM controller 110 and request memory read and write operations therefrom. Examples of such requestors are central processing units (CPUs), direct memory access (DMA) devices, second level cache devices and input/output (I/O) channel devices. The requestor 102 is coupled with the DRAM controller 110 via the control bus 106 and a common address bus 104, and to the DRAM 112 via the common data bus 108. The DRAM controller acts as an interface between the DRAM 112 and the requestors 102. Note that as depicted in FIG. 1, a plurality of DRAMs 112 can be coupled with a single DRAM controller 110. Also note that a plurality of combinations 134 of DRAM controller/DRAMs may be coupled with the requesters 102 via the address bus 104, the control bus 106 and the data bus 108, as shown.

Each DRAM controller 110 comprises an address multiplexer 114 and a DRAM timing control circuit 116. The address multiplexer 114 is coupled with the address bus 104. The address multiplexer 114 typically converts an address originating from the requestor 102, into a time-multiplexed row and column address required by the DRAM 112. The time-multiplexed row and column address are sent to the DRAM 112 via the address bus 118.

As discussed above, the address bus 118 required for DRAMs is typically at most, half as wide as the requestor's address bus 104 and the DRAM input address bus 130. For example, a typical implementation of a computer system having 64 Mbytes of DRAM, generally requires an address bus that is at least 26 bits wide. That is, a minimum of 26 binary digits are required to represent 65,536,000 individual address locations. In some implementations additional address lines are also used for controlling DRAMs. For example, in systems that employ particularly large memory arrays, additional address lines are used to select between a plurality of DRAM blocks, where each block contains 64 Mbytes of DRAM. In this example, 3 address lines can be added to the required 26 address lines, and used to select between a maximum of 8 such blocks. Thus, in this example, the address busses 104 and 130 would be 29 bits wide. However, only 13 lines are required for the address bus 118 when using the previously described time-multiplexing technique. This savings is considerable when considering that a single DRAM controller 110 typically controls a plurality of DRAM chips 112.

Memory read and memory write requests are made by the requesters 102 via the control bus 106. The DRAM controller 110 responds to such requests by generating the appropriate signals and the appropriate timings for such signals to the DRAM 112 via the address lines 118 and the control lines RAS' 120, CAS' 12, OE' 124 and WE' 126. The data pertaining to a memory write is sent from the requestor 102 to the DRAM 112 via the bidirectional data busses 108 and 128 respectively. Likewise the data pertaining to the memory read is sent from the DRAM 112 to the requestor 102 via the bidirectional data busses 128 and 108 respectively. Generally, the DRAM controller 110 also controls and generates periodic refresh cycles as required by the DRAM 112. Arbitration between read and write requests and such refresh operations are also typically managed by the DRAM controller 110.

Figure 2:
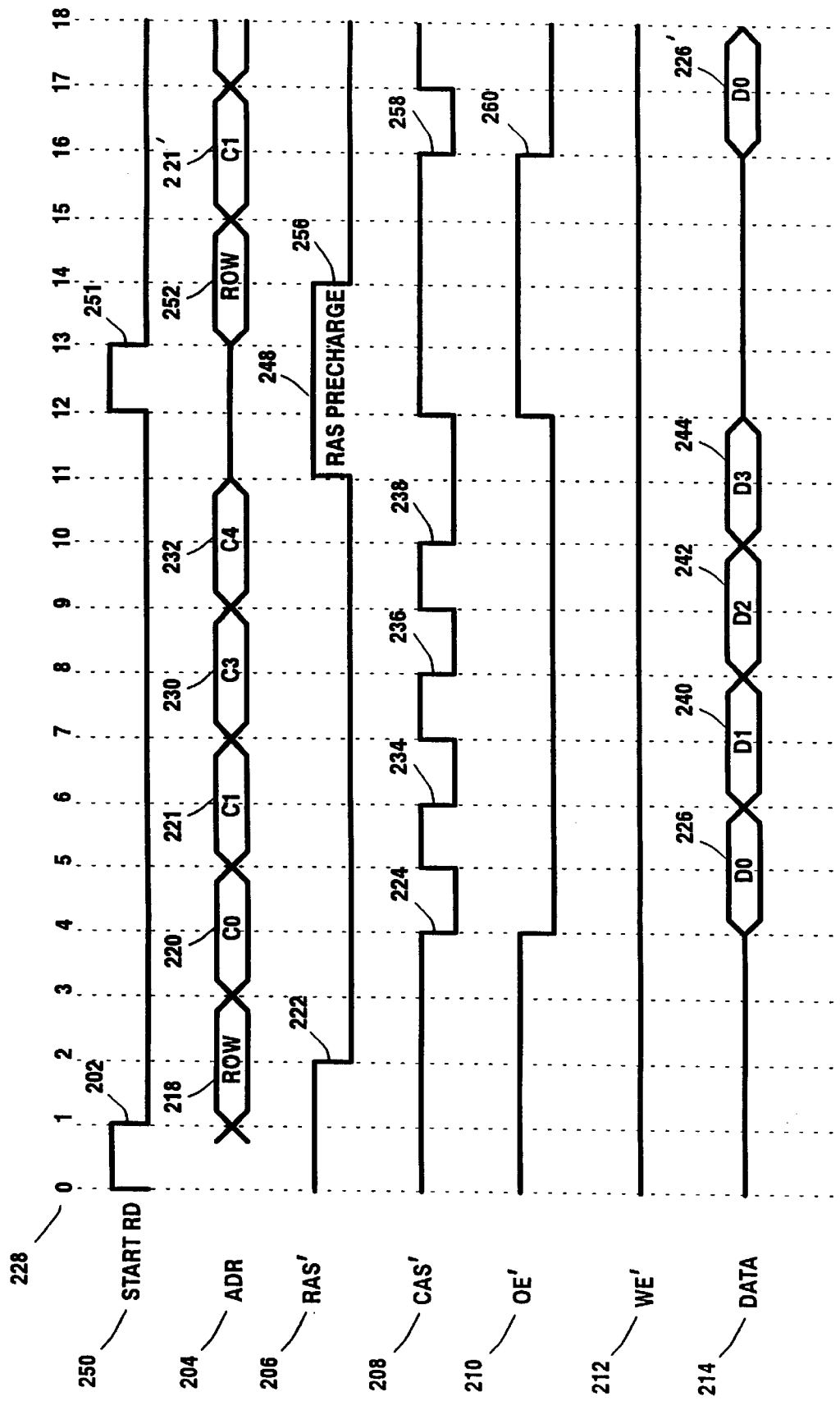
FIG. 2 is a typical timing diagram depicting two sequential read sequences for a DRAM device.

The output signals from the DRAM controller 110, specifically the signals on the address bus 118, the RAS' line 120, the CAS' line 122, the OE' line 124 and the WE' line 126, will be described with reference to the timing diagram in FIG. 2. The timing diagram in FIG. 2 depicts timing relationships for a typical DRAM read operation. In this case, the read operation depicted is a four-word page mode read request. This is a common type of read request supported for example, by COTS extended data out (EDO) DRAMS. In this mode of operation, four words of data which are stored within a common row are accessed by specifying a single row address followed by four successive column addressess. The single row address, coupled with each of the four column addresses comprises four distinct row/column addresses. Because the row address is only specified once, the sequence time to read four words of data is substantially decreased.

Note that the timing diagram in FIG. 2 is used to show typical requirements related to the control line interrelationships and the types of timing constraints generally provided by memory controlling devices. Other modes of operation, such as write or refresh modes could have been used to convey the principles depicted herein. Accordingly, the read operation used throughout the instant disclosure is used as an example in order to distinctly point out the features and functions provided by a preferred embodiment of the present invention. The same principles apply to other modes of operation such as different types of read modes, write modes and refresh modes.

The timing diagram depicted in FIG. 2 is a typical timing diagram displaying nominal timings and relationships for the control signals for a DRAM device. The control signals are depicted as horizontal waveforms and are labeled at the beginning of each waveform, on the left side of the timing diagram. The numbers across the top of the timing diagram are time reference points that represent successive system clock pulses 228. In this example, 19 clock pulses are depicted that range from clock pulse 0 to clock pulse 18 (see the numbers to the right of the reference numeral 228). Note that when a particular clock pulse is referenced herein, it is hereinafter referred to as clock pulse 228-n, where n represents one of the numbers, 0–14, as depicted across the top row of the timing diagram 228. For example, the transition 222 of the RAS' waveform 206 occurs at the clock pulse 228-2. Note that the "'" symbol at the end of a waveform signal name, such as RAS' 206, indicates that the associated signal is active upon a low logic level.

The timing relationships required for a typical DRAM will now be described. A start read sequence begins when the start read signal 250 transitions from a high to a low logic level 202. The DRAM 112 latches the row address 218 upon the falling edge of the row address strobe (RAS') 222. Thus, during the clock pulse 228-2, when the DRAM controller 110 generates the falling edge 222 of the RAS' signal 206, the address multiplexer 114 must contemporaneously supply the DRAM 112 with the appropriate row address 218, corresponding with the read request generated by the requestor 102. The row address 218 is transmitted to the DRAM over the address bus 118.

Typically the row address 218 is a translated output originating from the address multiplexer 114 of the DRAM controller 110. As previously stated, the address multiplexer 114 translates an address that comprises the full width of the address busses 104 and 130. Each full length address is translated into separate row and column address, which are time multiplexed to the DRAM chips 112, as can be seen by the row and column address signals 218 and 220. Note that as previously stated, each row and column address comprises the width of the smaller address bus 118. This method of row/column addressing reduces the number of address lines (typically by half) attached to each DRAM chip. The larger address busses 130 are attached only to each of the DRAM controller chips 110, which are typically much less plentiful than the plurality of DRAM chips comprising a typical computer system having large memory arrays.

Referring back to FIG. 2, the next event occurs at the clock pulse 228-4. At clock pulse 228-4, the column address strobe (CAS') 208 transitions to a low logic level 224. This event causes the DRAM 112 to latch-in the column address 220 via the address-bus 118. Thus, during the clock pulse 228-4, when the DRAM controller 110 generates the falling edge 224 of the CAS' signal 208, the address multiplexer 114 must contemporaneously supply the DRAM 112 with a valid column address 220, corresponding with the requestor's 102 read request.

At the same time, during clock pulse 228-4, the output enable (OE') signal 210 transitions to a low logic state 246, causing the DRAM 112 to turn on its output drivers. Consequently, the data stored in the memory location identified by the row/column addresses 218/220 now appears on the data bus 108 128. Thus, the data D0 226 is now available for the requestor 102 to read via the data bus 108.

Next, at the clock pulse 228-6, the CAS' signal 208 once again goes low at 234. This causes the DRAM 112 to latch-in the second column address 228. At this time the OE' signal 210 remains low and the DRAM turns on its output drivers. This causes the data stored in the memory location identified by the row/column address 218/228 to appear on the data bus 128. At this point the data D1 240 is available for the requestor 102 to read via the data bus 108.

Next, at the clock pulse 228-8, the CAS' signal 208 goes low 234, causing the DRAM 112 to latch-in the column address 230. At this time the OE' signal 210 remains low and the DRAM turns on its output drivers so that data from the row/column address 218/230 is output to the data bus 128. At this point the data D2 242 is available for the requestor 102 to read via the data bus 108.

Finally, at the clock pulse 228-10, the CAS' signal 234 goes low, causing the DRAM 112 to latch-in the column address 232. At this time the OE' signal 210 remains low and the DRAM turns on its output drivers so that data from the row/column address 218/232 is output to the data bus 128. At this point the data D3 244 is available for the requestor 102 to read via the data bus 108. Note a read operation is depicted in FIG. 2; the write enable (WE') signal 212 remains high throughout the entire read sequence.

Immediately following this four-word page read sequence, a second read sequence is depicted in FIG. 2. The second read sequence cannot be started immediately after the completion of the first read sequence due to a DRAM constraint known as RAS precharge 248. RAS precharge is a time period required to precharge the dynamic circuitry in typical DRAM devices in preparation for the next memory cycle. In this example, RAS precharge 248 is 3 clock cycles long and occurs during the clock pulses 228-11 through 228-14. Different DRAM devices may specify different time periods required for the RAS precharge time.

In this example, the earliest time period in which a subsequent read cycle may begin is during the clock pulse 228-12 to compensate for the RAS precharge 248 time period requirement. Thus, a second start read sequence begins when the start read signal 250 transitions from a high to a low logic level 254 at the clock pulse 228-13. The second read sequence functions in the same manner as the first read sequence as described above. Thus, the new row address 252 is latched into the DRAM 112 upon the falling edge 256 of the RAS' signal 206. Similarly, the new column address 221' is latched into the DRAM device 112 upon the falling edge 258 of the CAS' signal 208. Finally, at the same time the OE' signal 210 transitions to low at 260, causing the DRAM 112 to turn on its output drivers so that data from the row/column address 252/221' is output to the data bus 214—(previously 244 was changed to 128).

Note that the data bus 214 remains idle for 4 clock pulses (from 228-12 through 228-16) between the preceding successive read operations. This phenomenon of idle data bus periods generally occurs with other modes of DRAM operations as well, such as write and refresh cycles. This is due to the required set-up time and the RAS precharge time, as previously described. In addition, idle data bus periods may occur with other types of memory devices. Note that for a typical system which operates at a system clock speed of 50 Megahertz, each clock pulse 228 represents an elapsed time of 20 nanoseconds (ns.). Thus in this case, the data bus is idle for 80 ns between two successive read operations.

Figure 3:
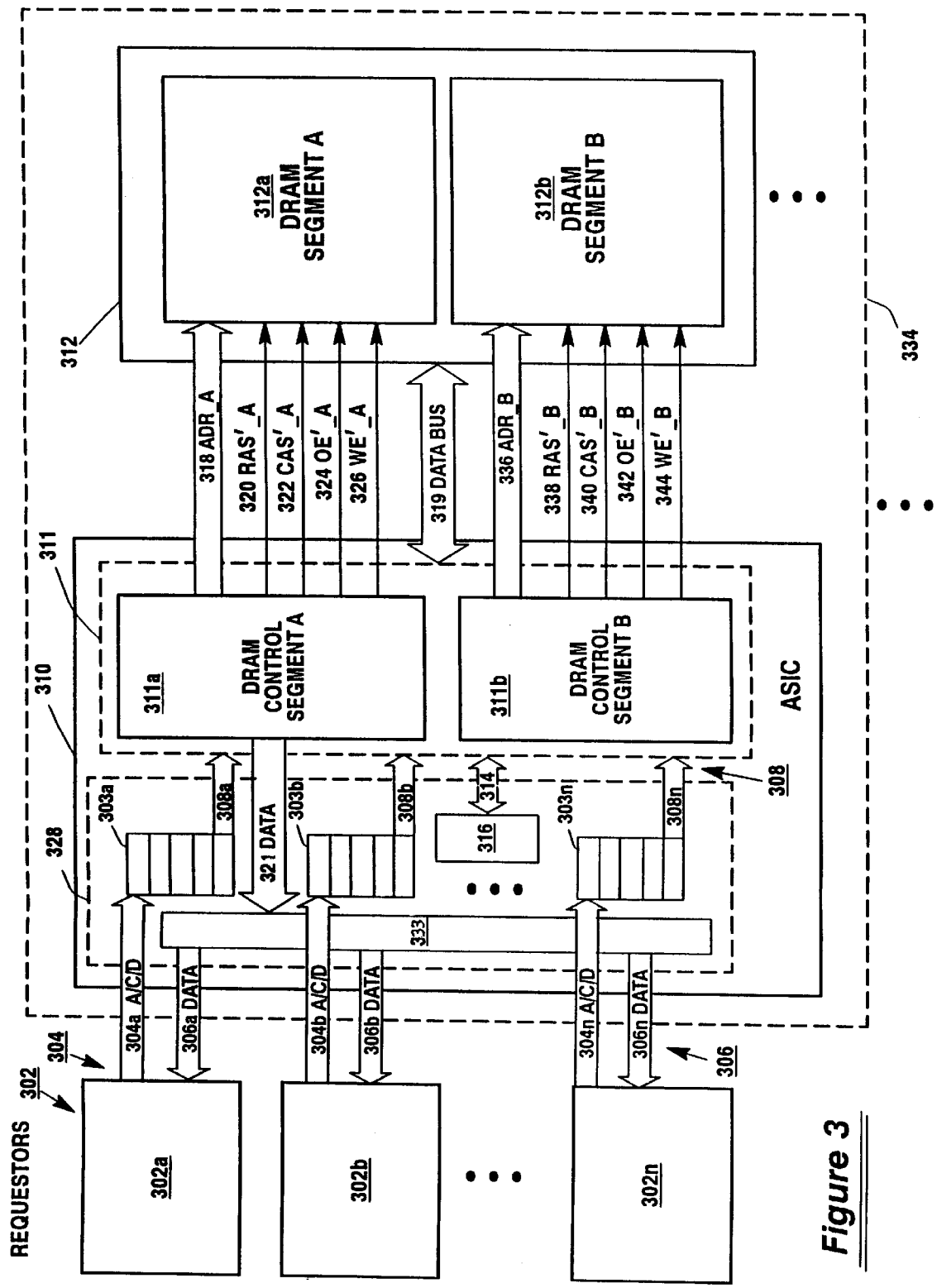
FIG. 3 is a block diagram depicting a typical operating environment including a preferred embodiment of the present invention.

FIG. 3 is a block diagram depicting a typical operating environment including a preferred embodiment of the present invention. A preferred embodiment of the present invention is implemented using an application-specific integrated circuit (ASIC) device. Accordingly, this example refers to a preferred embodiment of the present invention as the ASIC 310. The ASIC 310 acts as an interface between the DRAM 312 and a plurality of requestors 302a, 302b, . . . , and 302n (generally 302). The DRAM 312 is divided into two segments, 312a and 312b (generally 312). Note that as depicted in FIG. 3, a plurality of DRAMs 312 can be coupled with a single ASIC 310. Also note that a plurality of such combinations 334 of ASIC/DRAMs may be coupled with each of the plurality of the requestors 302.

The ASIC 310 includes two components referred to herein as the interface controller 328 and the DRAM controller 311. The DRAM controller 311 comprises a pair of complementary control segments 311a and 311b (generally 311). Each control segment 311 controls one DRAM segment 312. Accordingly, the control segment 311a provides control signals to the DRAM segment 312a and the control segment 311b provides control signals to the DRAM segment 312b. The interface controller 328 provides an interface between the plurality of requestors 302 and the DRAM controller 311. The functions provided by each of the components 328 and 311 will be described below.

The DRAM controller 311 provides the DRAM 312 with address and control signals. Each control segment 311a and 311b is coupled with each DRAM segment 312a and 312b, via individual sets of address and control lines. For example, the control segment 311a is coupled with DRAM segment 312a via the address lines ADR_A 318. Similarly, the control segment 311a is coupled with the DRAM segment 312a via the control lines RAS'_A 320, CAS'_A 322, OE'_A 324, and WE'_A 326. Likewise, the control segment 311b is coupled with DRAM segment 312b via the address lines ADR_B 336. In addition, the control segment 311b is coupled with the DRAM segment 312b via the control lines RAS'_B 338, CAS'_B 340, OE'_B 342, and WE'_B 344.

A bidirectional data bus 319 is shared between the complementary pair of DRAM segments 312a and 312b. Thus, data is transmitted along the data bus 319 in the direction from the DRAM 312 to the DRAM controller 311 during the processing of a read request from a requestor 302. Similarly, data is transmitted along the data bus 319 in the direction from the DRAM controller 311 to the DRAM 312 during a the processing of write request from a requestor 302.

The interface controller 328 provides an interface between the plurality of requestors 302 and the DRAM controller 311. Each requestor 302 is coupled with the interface controller via two unidirectional buses, as depicted by the buses 304a, 304b, . . . , and 304n (generally 304), and 306a, 306b, . . . , and 306n (generally 306). The first unidirectional bus 304 transmits address, control and data signals from the requestors 302 to individual memory request queues within the interface controller 328. The individual memory request queues, 303a, 303b, . . . , and 303n (generally 303), store a plurality of requests from the requestors 302. Such requests are subsequently transferred from the memory request queues 303 to the DRAM controller 311 via the memory request queue outputs 308a, 308b, . . . , and 308n (generally 308).

The second unidirectional bus as depicted by the bus 306 transmits data from a data storage area 333—(previously 310 was changed to 311). within the interface controller 328 to the requestors 302. Other functions are typically provided by the interface controller 310. For example, the interface controller typically provides control for the periodic refresh cycles required by the DRAM 312. In addition, arbitration between pending read, write and refresh requests is typically managed by the interface controller 328. These and other functions are represented by the logic control block 316 and the bidirectional signal bus 314.

Figure 4:
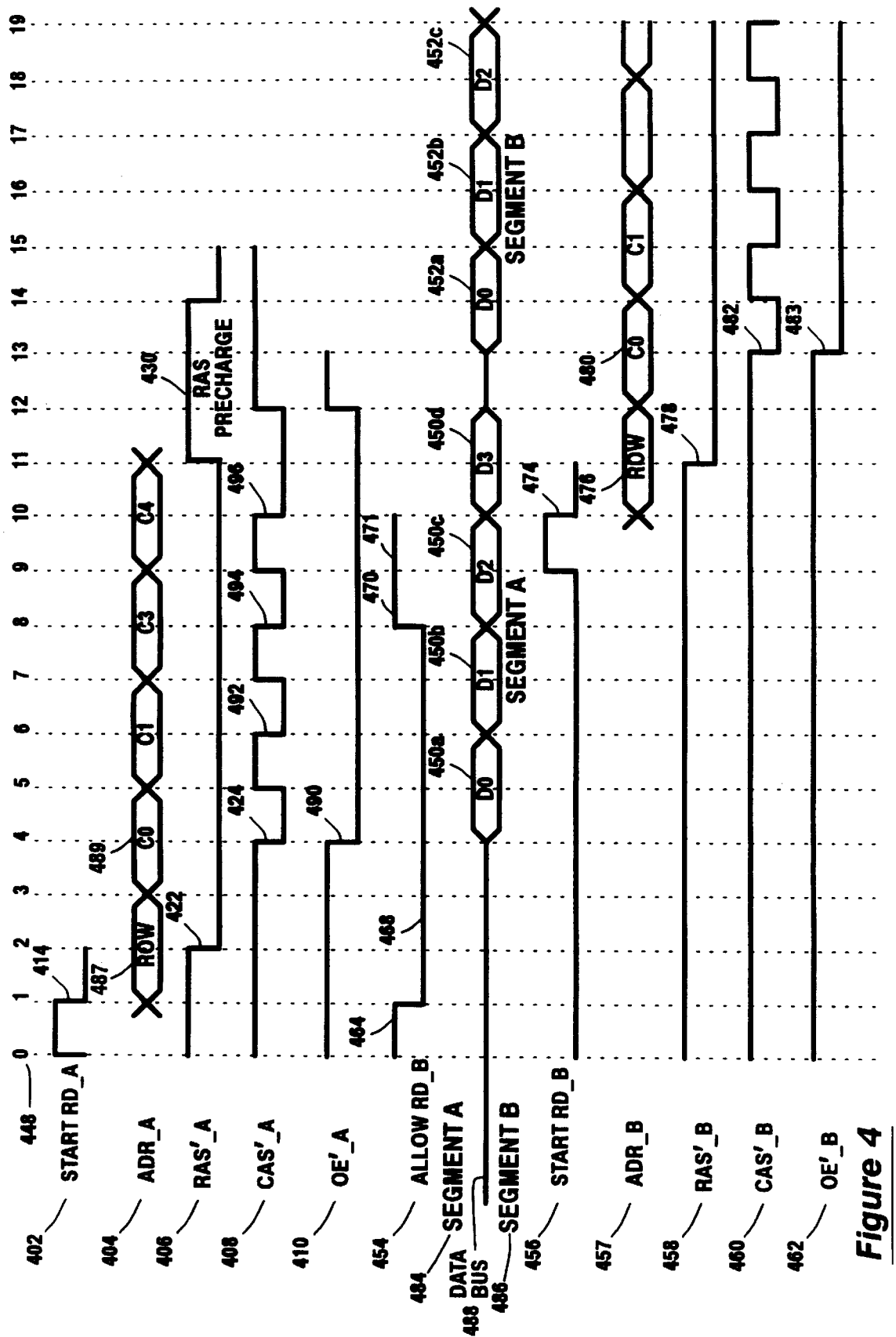
FIG. 4 is a typical timing diagram depicting two simultaneous read control sequences for a DRAM device according to an implementation of the present invention.

The control signals generated by an embodiment of the present invention as depicted in FIG. 3 will now be described with reference to the timing diagram in FIG. 4. Note that the timing diagram depicted in FIG. 4 is a read control sequence that is similar to the read control sequence as previously described and depicted in FIG. 2. The timing specifications for both read control sequences as depicted in FIGS. 2 and 4, are the same. However, FIG. 2 depicts two successive read sequences from a single DRAM and FIG. 4 depicts two successive and overlapping read sequences for two DRAM segments 312a and 312b according to an embodiment of the present invention.

Accordingly, the timing diagram in FIG. 4 is divided into two sections. The top section 'Segment A' 484 represents the signals generated by the control segment 311a. Likewise, the bottom section 'Segment B' 486 represents the signals generated by the control segment 311b. Accordingly the signals ADR_A 404, RAS'_A 406, CAS'_A 408 and OE_'A 410 correspond with the control segment 311a control lines ADR_A 318, RAS'_A 320, CAS'_A 322 and OE'_A 324 respectively. Similarly, the signals ADR_B 457, RAS'_B 458, CAS'_B 460 and OE_'B 462 correspond with the control segment 311b control lines ADR_B 336, RAS'_B 338, CAS'_B 340 and OE'_B 342 respectively. Note that the signals that correspond with the control lines WE_A 326 and WE_B 344 are not depicted in FIG. 4 and are assumed to be in the high logic state throughout these read sequences.

The signals associated with the shared data bus 319 is depicted in FIG. 4 as the data bus signal 488 located between the read sequences for segments A 484 and B 486. Further, as indicated, the first set of data words D0 450a, D1 450b, D2 450c and D3 450d are associated with the control sequence from segment A 484. Likewise, the second set of data words D0 452a, D1 452b, D2 452c and D3 (not shown) are associated with the control sequence from segment B 486.

The read sequence for the Segment A 484 begins with the Start Rd_A signal 402. Upon the falling edge 414 of the Start Rd_A signal 402, the DRAM controller 310 generates a row address 487 on the ADR_A 318 as depicted by the ADR_A signal 404. The row address 487 is latched into the DRAM segment 312a upon the falling edge 422 of the RAS'_A control signal 406. The column address 488 is latched into the DRAM segment 312a upon the falling edge 424 of the CAS_A signal 408. At the same time, upon the falling edge 490 of the OE'_A signal 410, the DRAM segment 312a turns on its output drivers causing a word of data to appear on the data bus 319, as depicted by data word 450a on the data bus 488. The other data words 450b, 450b and 450c appear on the data bus 319 in a similar fashion in response to the subsequent column addressess (as depicted on the ADR_A signal 404) and the subsequent falling edges 492, 494, and 496 of the CAS'_A signal 408.

At the beginning of this read sequence an allow read signal depicted by the Allow Rd_B signal 454, is generated by the control segment 311a. Note that other allow signals are also generated by the control segment 311a at the beginning of this read sequence as well as at the beginning of all other types of control sequences. For example, at the beginning of the read sequence an allow write and an allow refresh signal is also generated by the control segment 311a. However, for simplicity, only the Allow RD_B signal 454 is depicted in the example in FIG. 4. Further, it is assumed that a read request is pending for the control segment 311b in order to describe the relationship between the Allow Rd_B signal and the pending start of the pending read request. It should be appreciated that each control segment 311a and 311b generates a set of allow mode signals for the complementary control segment, at the beginning of each control sequence that occurs within the control segment. For a example and a complete description of how such allow mode signals are generated, refer to the aforementioned cross-referenced application.

Accordingly, the control segment 311b monitors the Allow Rd_B signal 454 to determine when a read sequence is allowed to begin therein. If a read sequence is pending for the DRAM segment 312b, such sequence can begin only if the Allow Rd_B signal 454 is at a high logic state (such as 470). Thus, as can be seen by the Start Rd_B signal 456, a start read sequence begins at the clock pulse 448-9 as depicted by the low to high transition 472 of the Start Rd_B signal 456.

Thus, at the falling edge 474 of the Start Rd_B signal 456, the control segment 311b generates a row address 476. The row address 476 is latched into the DRAM segment B 312 during the falling edge 478 of the RAS'_B signal 458. The column address 480 is latched into the DRAM segment B 312b upon the falling edge 482 of the CAS'_B signal 460. At the same time, during the falling edge 483 of the OE'_B signal 462, the DRAM segment B 312b turns on its output drivers causing a word of data to appear on the data bus 319, as depicted by data word 452a on the data bus signal 488. The other data words 452b, 452c and 450d (not shown) appear on the data bus 319 in a similar fashion in response to the subsequent column addressess and falling edges of the CAS'_B signal 460.

Note that the timing specifications and control for each of the control sequences depicted for Segment A 484 and Segment B 486 are the same as was previously described with respect to the read sequence in FIG. 2. However, by overlapping the read sequence for Segment A 484 and Segment B 486 as depicted by FIG. 4, the data bus 488 remains idle only for one clock cycle 448-12 between read sequences. This is to be contrasted with the data bus 214 in FIG. 2, which remains idle for 4 clock cycles between the successive read sequences.

The present invention optimizes the ordering of pending memory requests that originate from a plurality of requesters to best utilize the overlapping control sequence capabilities, as discussed above. An example of an apparatus and technique that can be used to optimally select the processing order of such requests will now be described with reference to FIG. 5.

Figure 5A:
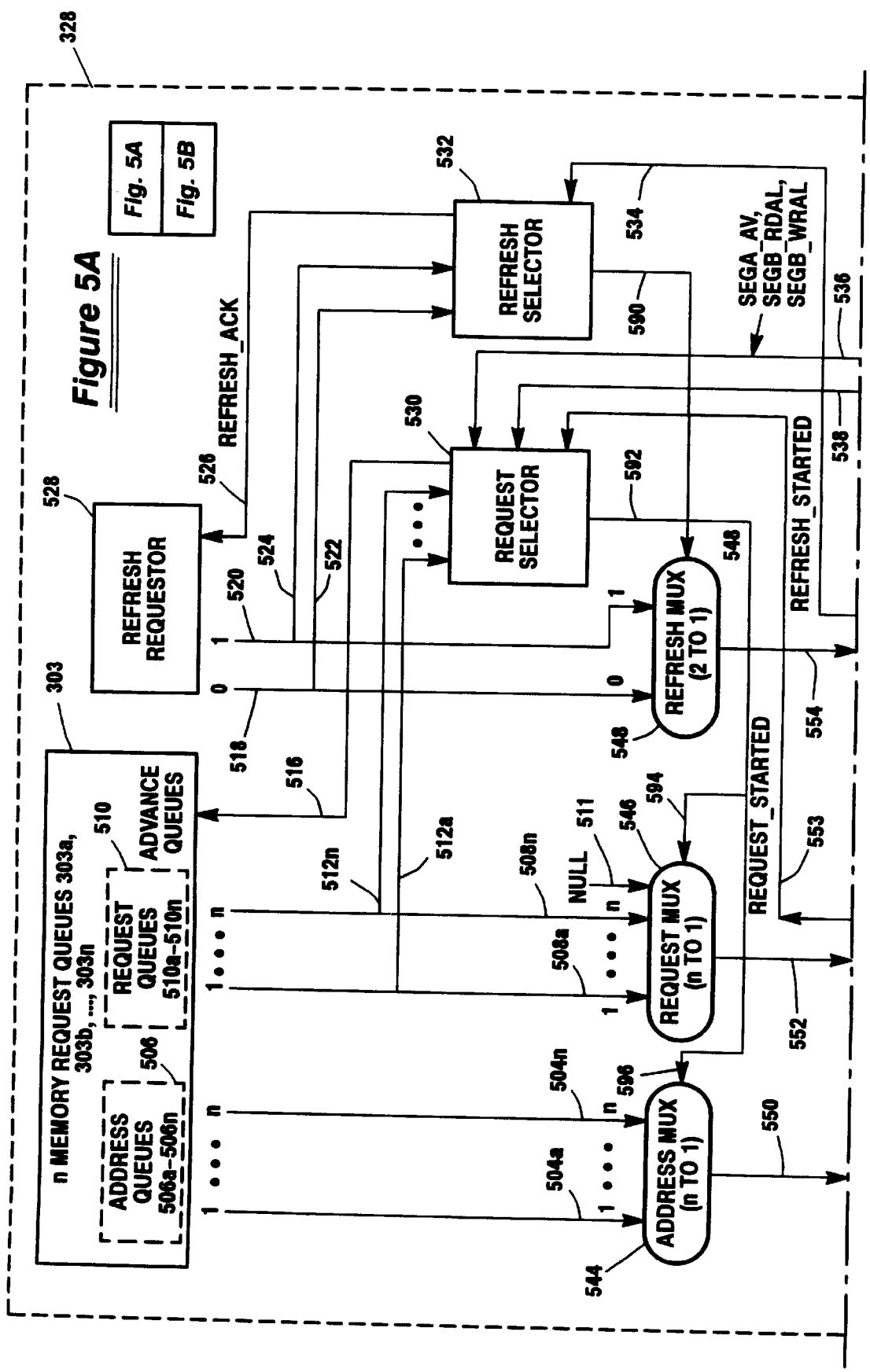
FIGS. 5A and 5B is a block diagram depicting a preferred embodiment of the present invention.
Figure 5B:
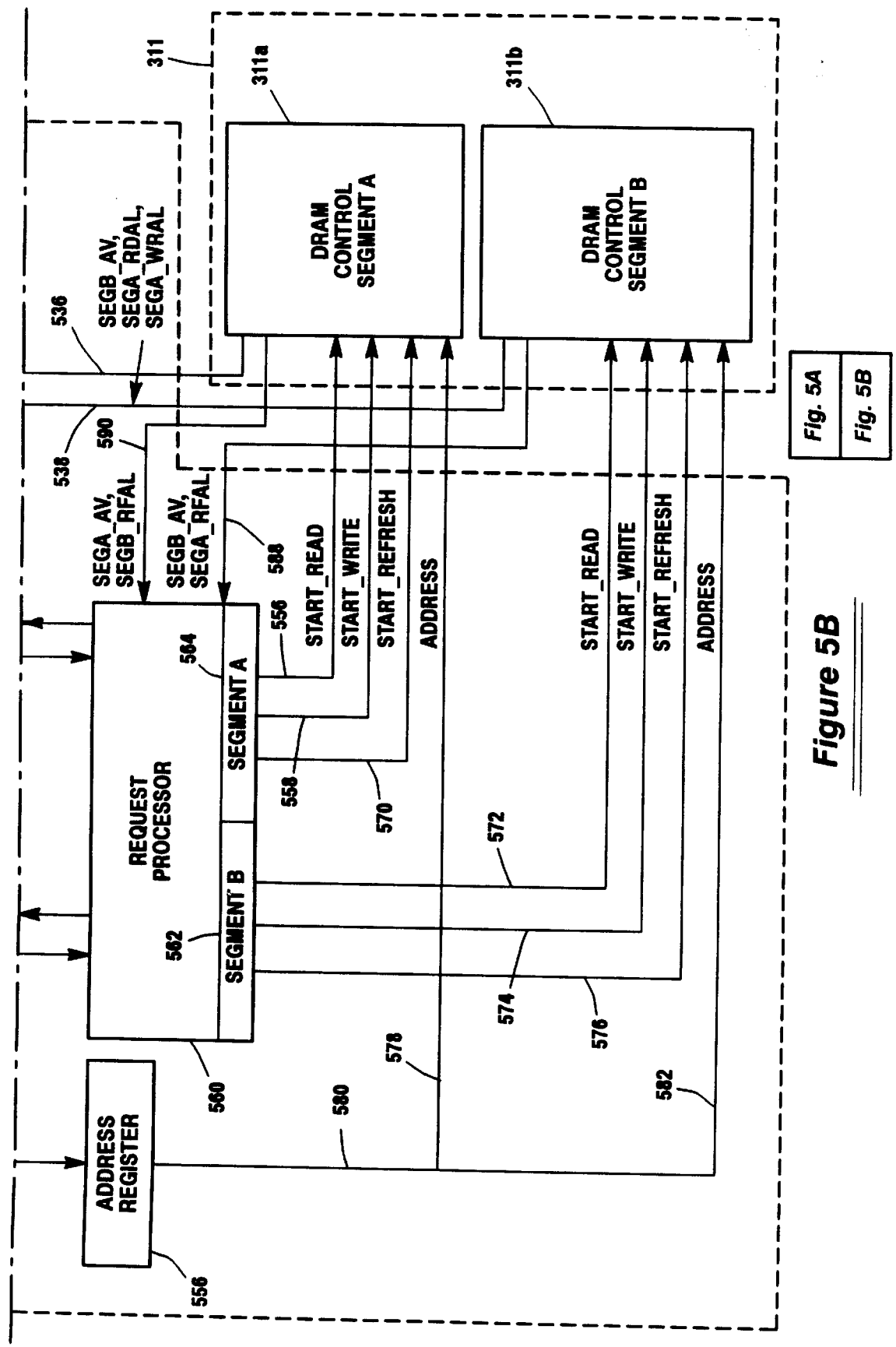

FIG. 5 depicts a detailed view of the interface controller 328 and the DRAM controller 311 as depicted in FIG. 3. The DRAM controller 311 comprises the DRAM control segments 311a and 311b. The interface controller 328 provides an interface between the plurality (n) of requestors 302 (not shown in FIG. 5), and the DRAM controller 311. The interface controller 328 receives requests from the requesters via the plurality (n) of memory request queues 303 as shown in the top left corner of FIG. 5.

The request selector 530 selects the next request (according to specific criteria, described below) from among the plurality of requests within the memory request queues 303. The selected request 552 is then processed by the request processor 560. The request processor 560 processess the selected request 552 by supplying the appropriate control segment 311a or 311b with the appropriate start signal, such as the start_read 556, start_write 558 or start_refresh 570 signals being supplied to DRAM control segment 311a. The address corresponding with the selected request 552 is simultaneous supplied to the DRAM control segment 311a or 311b, via the address lines 578 or 582. Details of these functions will now be described below.

The following table contains the names and definitions of the signals that correspond with the control lines 538 and 536 as depicted in FIG. 5 and as will be described below.

| | |
|---|---|
| SEGA_AV | DRAM segment 312a available (previous access and RAS precharge completed) |
| SEGB_AV | DRAM segment 312b available (previous access and RAS precharge completed) |
| SEGA_RDAL | Read sequence allowed for DRAM segment 312a |
| SEGA_WRAL | Write sequence allowed for DRAM segment 312a |
| SEGB_RDAL | Read sequence allowed for DRAM segment 312b |
| SEGB_WRAL | Write sequence allowed for DRAM segment 312b |
| SEGA_RFAL | Refresh sequence allowed for DRAM segment 312a |
| SEGB_RFAL | Refresh sequence allowed for DRAM segment 312b |

As stated, one memory request queue is provided for each requestor 302 that interfaces with the interface controller 328. Thus, in this example, the interface controller 328 comprises (n) memory request queues 303. As shown in FIG. 5, the memory request queues 303 are divided into two separate sets of queues: a plurality of address queues 506a–505n (generally 506); and a plurality of request queues 510a–510n (generally 510). The entries in the address queues 506 comprises the addresses associated with the corresponding entries in the request queues 510.

Each address queue 506 comprises an address queue bus 504a–504n (generally 504). Each address queue bus 504 is coupled with the current address in each address queue 506. The current address is the next address that is to be output from each address queue 506. Each request queue 510 comprises a request queue bus 508a–508n (generally 508). Each request queue bus 508 is coupled with the current request in each request queue 510. The current request is the next request that is to be output from each request queue 510.

The plurality of address queue buses 504 are coupled with the address multiplexer 544. The address multiplexer 544 functions to gate the contents of one of the plurality of address queue buses 504 to the address register 556 via the address multiplexer output lines 550. The selection of which address queue bus is gated to the output lines 550 is controlled via the address multiplexer control lines 596 which is coupled with the request selector 530.

Similarly, the plurality of request queue buses 508 are coupled with the request multiplexer 546. The request multiplexer 546 functions to gate the contents of one of the plurality of request queue buses 508 to the request processor 560, via the request multiplexer output lines 552. The selection of which request queue bus is gated to the output lines 552 is controlled via the request multiplexer control lines 594, which is coupled with the request selector 530.

The request selector 530 is coupled with each of the request queue buses 508 via the request selector input lines 512a–512n (generally, 512). The request selector analyzes each of the current requests via the input lines 512 to determine if any requests are pending. Additionally, the request selector determines which pending request is allowed to begin according to control signals received from the DRAM controller 311. For example, the DRAM control segment 311a provides the control signals SEGA_AV, SEGB_RDAL, and SEGB_WRAL to the request selector via the control lines 536.

Each of the preceding control lines can provide a signal comprising a value of 1 or 0 to the request selector 530. A value of 1 indicates that the function represented by the control signal is true and a value of zero indicates that such function is false. For example, a value of 1 on the control line SEGA_AV 536 indicates that the DRAM control segment 311a is available to begin a new control sequence because the previous control sequence is complete and the RAS precharge requirement has been satisfied. Similarly, a value of 1 on the control line SEGB_RDAL 536 indicates that the DRAM control segment 311b is allowed to begin a read control sequence. This is an example of an allow mode signal as previously described. Finally, a value of 1 on the control line SEGB_WRAL 536 indicates that that the DRAM control segment 311b is allowed to begin a write control sequence.

Likewise the DRAM control segment 311b provides the control signals SEGB_AV, SEGA_RDAL, and SEGA_WRAL to the request selector via the control lines 538. A value of 1 on the control line SEGB_AV 538 indicates that the DRAM control segment 311b is available to begin a new control sequence therein. Similarly, a value of 1 on the control line SEGA_RDAL 538 indicates that the DRAM control segment 311a is allowed to begin a read control sequence. Finally, a value of 1 on the control line SEGA_WRAL 538 indicates that that the DRAM control segment 311a is allowed to begin a write control sequence The criteria that the request selector uses to determine if any of the current requests 512 are allowed to begin within the DRAM control segments 311a and 311b are depicted in the following table. The table below contains the control signals that are coupled with the request selector 530, and the DRAM control segments 311a and 311b via the control lines 536 and 538, respectively. A value of X in the table below indicates a "don't care" condition.

| Result of Request Selector | SEGA_ AV | SEGB_ AV | SEGA_ RDAL | SEGB_ RDAL | SEGA_ WRAL | SEGB_ WRAL |
|---|---|---|---|---|---|---|
| Allow read in 311a | 1 | X | 1 | X | X | X |
| Allow read in 311b | X | 1 | X | 1 | X | X |
| Allow write in 311a | 1 | X | X | X | 1 | X |
| Allow write in 311b | X | 1 | X | X | X | 1 |

Thus, as indicated in the above table, a read sequence in segment 311a is allowed when a value of 1 appears on the control lines SEGA_AV and SEGA_RDAL 536. Similarly, a read sequence in segment 311b is allowed when a value of 1 appears on the control lines SEGB_AV and SEGB_RDAL 538. Likewise, a write sequence in segment 311a is allowed when a value of 1 appears on the control lines SEGA_AV and SEGA_WRAL 536. Finally, a write sequence in segment 311b is allowed when a value of 1 appears on the control lines SEGB_AV and SEGB_WRAL 538.

Upon each pulse of a system clock, the request selector analyzes the requests in the request queue via the request bus input lines 512a–512n. When a request becomes active within one or more request queues 508, (i.e. at least one request is pending), the state of the request queues outputs are captured by the request selector. All of the captured requests are then processed as described below before the next set of requests are captured from the request queue inputs 512.

After a capture is complete, all captured requests are analyzed in parallel during each system clock to determine which request, if any, is allowed according the above criteria. A captured request is allowed when all conditions in one row in the above truth table are satisfied. If a request is allowed, the request selector 530 selects the lowest numbered allowed request and transmits its associated requestor number (1–n) to the request multiplexer 546 via the control lines 592. At the same time, the request selector 530 sends the same requestor number to the address multiplexer 596.

This causes the allowed request to be gated to the output of the request multiplexer 552 and transmitted to the request processor 560. At the same time, the associated address is gated to the output of the address multiplexer 550 and stored in the address register 556, so that it is available to the DRAM control segments 312 via the address lines 578 and 582.

When the request is started by the request processor 560, a 'request started' signal 553 is sent to the request selector. This causes the request selector to delete the started request from the set of captured requests. The request selector 530 then selects the lowest numbered allowed request from the remaining captured requests. If no requests are allowed during any clock pulse, the request multiplexer is signaled by the request selector 530 to select the NULL input 511.

When all captured requests have been started, the request selector sends the advance queue signal 516 for all captured requests to cause those queues to advance by one. The request queues whose contents have not been captured during the last capture are not advanced. Finally, the above process is repeated with a new set of captured requests as soon as one request in one request queue 510 becomes active.

When a refresh sequence is required to be generated by one or both of the DRAM control segments 311, according to the refresh requester 528, the refresh requestor 528 sends signals to the refresh selector 532 via the two input lines 522 and 524. The refresh requests are held active by the refresh requestor until they are started by the request processor 560, and a refresh acknowledge signal 526 is sent from the request processor 560 to the refresh requestor 528. This causes the refresh requestor 528 to drop the refresh request.

The refresh selector 532 is coupled with the refresh multiplexer 548 via the control line 590. The refresh multiplexer 548 is coupled with the refresh requestor 528 via the two input lines 518 and 520. Each input line represents a refresh request for one of the two control segments 311a or 311b. Whenever a refresh is active, its number is output to the refresh multiplexer from the refresh selector. This causes the appropriate refresh request to be gated via the refresh multiplexer 548 to the output 554 and transmitted to the request processor 560. If two requests are active, the lowest number request is selected first, followed by the higher number request.

The request processor 560 arbitrates between refresh requests from the refresh multiplexer 548 and read/write requests from the request multiplexer 546. Refresh requests have the highest priority. Thus, if both a refresh request and a read/write request arrive at the same time, the refresh request is processed first and the read write request is held until all refresh requests have been processed. Otherwise, read/write requests from the request multiplexer 546 are processed immediately.

Requests from the request multiplexer 546 are processed by the request processor 560 as follows. The request processor 560 decodes the request and generates the appropriate start signal to the appropriate control segment via the segment A and segment B signal interfaces 564 and 562, respectively. For example, in case of a read request for control segment 311a, a start read signal is sent to control segment 311a via the start_read control line 556. Likewise, in case of a read request for control segment 311b, a start read signal is sent to control segment 311b via the start_read control line 572. Similarly, in case of a write request for control segment 311a, a start write signal sent to control segment 311a via the start_write control line 558. Finally, in case of a write request for control segment 311b, a start write signal sent to control segment 311b via the start_write control line 574.

In all cases, once a request is started as described above, a request_started signal is sent from the request processor 560 to the request selector 530, so that the captured request is deleted from the set of captured requests within the request selector 530.

The request processor 560 also determines when refreshes are allowed to be started. The criteria that the request processor 560 uses to determine when a refresh can be started are depicted in the following table. The table below contains the control signals that are coupled with the request processor 560, and the DRAM control segments 311a and 311b via the control lines 590 and 588 respectively. A value of X in the table below indicates a "don't care" condition.

| Result of Request Processor 560 | SEGA_ AV | SEGB_ AV | SEGA_ RFAL | SEGB_ RFAL |
|---|---|---|---|---|
| Start refresh 311a | 1 | X | 1 | X |
| Start read in 311b | X | 1 | X | 1 |

Thus, an active refresh request is started when the corresponding segment is available and the refresh allow signal for the corresponding segment is active. When these conditions are satisfied, the request processor 560 sends a start refresh signal 570 or 576 to the appropriate DRAM control segment 311a or 311b, respectively.

Many other variations of embodiments and implementations of the present invention are possible without departing from the principles disclosed herein. While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A programmable memory controller comprising:
    a pair of control segments, each providing individual sets of address and control lines to a corresponding pair of memory segments, and each providing a plurality of allow mode signals indicating when control sequences can begin in the other control segment in said pair of control segments;
    a request selector, coupled to receive a plurality of memory requests and said plurality of allow mode signals, capable of selecting an optimal request from said plurality of memory requests according to said allow mode signals; and
    a request processor coupled to said pair of control segments and capable of receiving said optimal request, wherein said request processor decodes said optimal request and sends an appropriate start signal to one of said control segments in accordance with said optimal request.

2. The programmable memory controller of claim 1, wherein said request selector is coupled with a request multiplexer via control lines.

3. The programmable memory controller of claim 2, wherein said request multiplexer is coupled between said plurality of requests and said request processor, wherein said optimal request is gated to said request processor according to signals sent by said request selector via said control lines.

4. The programmable memory controller of claim 1, wherein said request processor is further coupled with refresh requests and arbitrates between said optimal request and refresh requests.

5. The programmable memory controller of claim 2 further comprising a plurality of memory request queues used to store said plurality of memory requests, each said memory request queue having an output coupled to said request multiplexer and said request selector.

6. The programmable memory controller of claim 5 wherein each said memory request queue comprises an address queue and a request queue.

7. A method for selecting a memory request from a plurality of requestors, said memory requests being directed towards a memory device having two memory segments being controlled by two control segments, each of said control segments having a separate control and address bus coupled with one of said memory segments so that overlapping control sequences can occur therein, said method comprising the steps of:
    (1) capturing a set of pending memory requests originating from the plurality of requestors;
    (2) synchronously analyzing each said pending memory requests in parallel until at least one said pending memory request is allowed;
    (3) selecting a selected memory request from the allowed memory request determined from step (2);
    (4) processing said selected memory request; and
    (5) repeating at least steps (2)–(4) until all said pending requests have been processed by said processing step.

8. The method of claim 7, wherein said capturing comprises the steps of
    storing a set of captured requests from a plurality of request queues whenever at least one memory request becomes active.

9. The method of claim 8, wherein said synchronously step comprises the steps of:
    decoding each said pending request into a decoded request, to determine the type of memory request and the destination of said pending request;
    comparing said decoded request against control signals from the control segments to determine whether said decoded request is allowed to begin in either of the two control segments.

10. The method of claim 8, wherein said processing step comprises the step of sending a start signal to one of said control segment.

11. The method of claim 8, wherein said selecting step comprises the step of sending to a request multiplexer, a control signal that corresponds with the requester that originates said allowed request, to gate said allowed request from said request queue to be used in said processing step.

12. A computer system comprising:
    a pair of memory segments;
    a memory controller having a pair of control segments, each coupled to one said memory segment via discrete sets of address and control lines, said memory controller capable of generating allow mode signals, said memory controller including:
    a request processor coupled to said control segments via a plurality of start signal lines, wherein said start signal lines are used for transmitting start signals to said control segments to start a control sequence therein;
    storage means, coupled to said request processor, for storing a plurality of memory requests; and
    selection means coupled to said storage means and said control segments for selecting one of said memory requests to be gated to said request processor according to said allow mode signals from said control segments; and
    a plurality of requesters coupled to said storage means.

13. The computer system of claim 12, wherein said storage means comprises a plurality of memory request queues each coupled with one of said plurality of requesters.

14. The computer system of claim 13, wherein said selection means comprises:
    a request multiplexer coupled between said request queues and said request processor;

a request selector coupled with said request multiplexer via multiplexer select lines, for controlling said request multiplexer to gate one of said memory requests to said request processor according to signals on said multiplexer select lines.

15. The computer system of claim 13, wherein each said memory request queue comprises an address queue and a request queue.

16. The computer system of claim 15, further comprising:

an address multiplexer coupled with said address queues;

an address register coupled between said address multiplexer and said control segments.

17. The computer system of claim 12, further comprising:

a refresh requestor that generates refresh requests;

a refresh selector coupled between said refresh requestor and said request processor; and arbitration means coupled to said request processor for arbitrating between said refresh requests and memory requests.

18. The computer system of claim 17, further comprising:

a refresh multiplexer coupled with said refresh requester and said request processor;

a refresh selector coupled with said refresh multiplexer via refresh multiplexer select lines, and said refresh requestor, for controlling said refresh multiplexer to gate one of said refresh requests to said request processor according to signals on said refresh multiplexer select lines.

19. A programmable memory controller for controlling a memory device having a first and second memory segment, said programmable memory controller comprising:

a first control segment, coupled to said memory device comprising:

a first address bus coupled to the first memory segment; and a first set of control lines coupled to the first memory segment for controlling memory accesses therein; and a first set of allow mode signal lines coupled to the first memory segment for indicating when a memory access request can begin in the second memory segment;

a second control segment, coupled to said memory device comprising:

a second address bus coupled to the second memory segment; and a second set of control lines coupled to the second memory segment for controlling memory accesses therein; and a second set of allow mode signal lines coupled to the second memory segment for indicating when a memory access request can begin in the first memory segment;

a request selector, coupled to receive a plurality of memory requests and said first and second sets of allow mode signal lines, capable of selecting an optimal request from the plurality of memory requests according to signals from said first and second sets of allow mode signal lines; and a request processor coupled to said first and second control segments and capable of receiving said optimal request, wherein said request processor decodes said optimal request and sends an appropriate start signal to one of said control segments in accordance with said optimal request.

* * * * *